United States Patent Office 2,777,983
Patented Jan. 15, 1957

2,777,983

CAPACITOR-EXCITED ASYNCHRONOUS ALTERNATORS FOR SINGLE-PHASE LOADS

Fritz Kümmel, Erlangen, Germany, assignor to Siemens-Schuckertwerke Aktiengesellschaft, Berlin-Siemensstadt and Erlangen, Germany, a corporation of Germany Application February 16, 1956, Serial No. 566,023

Claims priority, application Germany, March 19, 1955

4 Claims. (Cl. 321—58)

My invention relates to asynchronous three-phase alternators for use with single-phase loads.

The operation of asynchronous alternators not being connected to an electric distribution line furnishing the reactive magnetizing power, requires the provision of accessory excitation devices. These excitation devices, in many cases, consist of combinations of capacitors and saturable reactors. Relative to the three phases of the asynchronous alternator, the known excitation devices are symmetrical, corresponding to a normally symmetrical three-phase loading of the asynchronous alternator. If only single-phase loads are connected to such an alternator, the limit of generated power is $1/\sqrt{3}$ of the rated power available for symmetrical three-phase loading, assuming the loads to be connected to the inter-phase voltage. The saturable reactors across the unloaded inter-phase voltages, when operating upon a single-phase load, do not appreciably participate in the reactive power control and therefore, as far as asynchronous alternators used only in single-phase operation are concerned, represent additional and uneconomical circuit components. However, one cannot simply do away with these reactors because this would make the generated voltage too much dependent upon the alternator load.

It is an object of my invention to provide an excitation system for capacitor-excited three-phase asynchronous generators used in single-phase operation that obviates the above-mentioned disadvantages.

To this end, and in accordance with my invention, I connect a capacitor and a saturable reactor to the alternator output mains in parallel relation to the load, I further connect the one loaded main that has the lagging phase voltage, and also the remaining unloaded main, with the star point of the asynchronous alternator through respective capacitors.

For further explanation reference will be had to the drawing in which.

Figure 1:
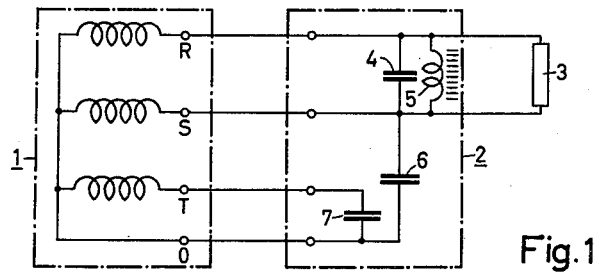
Fig. 1 is a schematic circuit diagram of an embodiment of an excitation system for an asynchronous alternator feeding a single-phase load.

Fig. 1 shows schematically an asynchronous alternator 1 whose three-phase armature windings are connected between the output terminals R, S, T and the star-point terminal O. Connected to the four terminals is an excitation device 2 for single-phase operation. The output circuit of the excitation device 2 includes a single-phase load 3. The excitation device 2 comprises a capacitor 4 and a saturable reactor coil 5 which are connected across the phase terminals R and S of the alternator in parallel relation to the load 3. Electrically connected between the same terminals S and T and the star-point terminal O of the alternator are respective capacitors 6 and 7.

Figure 2:
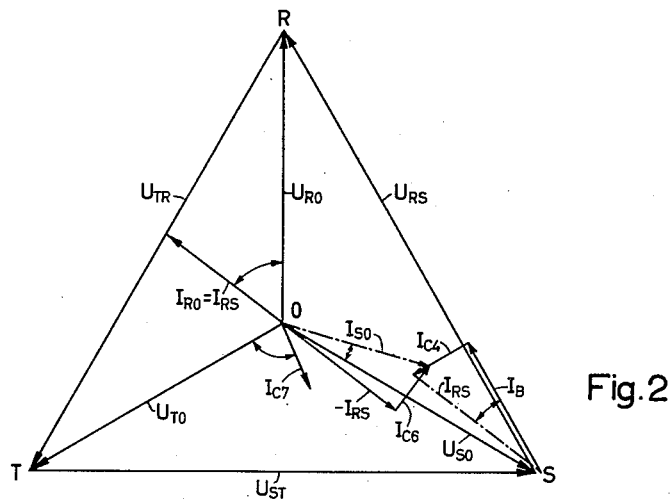
Fig. 2 is a vectorial voltage-current diagram for single-phase loading of the asynchronous alternator.

The vector diagram of Fig. 2 shows the corelation of the interphase voltages $U_{RS}$, $U_{ST}$ and $U_{TR}$, as well as the corelation of the phase voltages $U_{RO}$, $U_{TO}$ and $U_{SO}$. The alternator furnishes only the component $I_B$ of the load current I, whereas the reactive component of the load current must be supplied by the parallel connection of capacitor 4 and saturable reactor 5. Accordingly, the current vector $I_B$ is entered in the diagram in phase with the interphase voltage $U_{RS}$. Added to the vector $I_B$ is the capacitive current $I_{C4}$ at a leading angle of 90° el, the fundamental wave reactive current consumed by the saturable reactor 5 being already deducted. The resulting sum current $I_{RS}$ flows through the two phases R and S. The angular displacement of the current vector toward the zero point is indicative of the fact that the sum current $-I_{RS}$ is nearly in phase with the phase voltage $U_{SO}$ or is even lagging relative to that voltage. This is tantamount to the fact that the sum current $-I_{RS}$ does not contribute to supplying magnetizing reactive power for phase S. This magnetizing reactive power is rather furnished by the capacitor 6 connected between the terminals S and O. The phase T is not traversed by load current. For that reason the capacitor 7 must be connected across terminals T and O. The current $I_{RS}$ in phase $U_{RO}$ is leading and therefore takes care on its own to build up the magnetic field. Hence, an excitation capacitor relative to the latter phase is superfluous.

Figure 3:
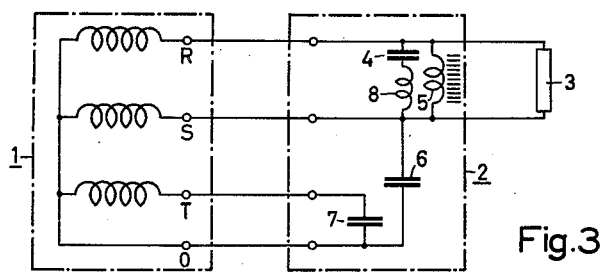
Fig. 3 is a circuit diagram of another embodiment of an excitation system according to the invention.

Due to the fact that the saturable reactor 5 operates in the non-linear portion of its magnetization characteristic, the load voltage receives upper harmonic waves which are undesired for certain loads. To avoid such upper harmonics, the excitation system according to Fig. 3, otherwise similar to that of Fig. 1, is further provided with an inductance coil 8 in series with the capacitor 4. The capacitor 4 and the inductivity 8 form a series resonance circuit which, depending upon its tuning, filters and suppresses certain disturbing upper harmonic waves. Generally this oscillatory circuit is preferably rated for the third harmonic so that this harmonic will be suppressed in the load voltage. The application of the series resonance circuit also increases favorably the load capacity of the alternator.

I claim:

1. With a capacitively excited asynchronous alternator having star-connected three-phase windings and three respective terminals connected to said windings, the combination of an excitation device for operating a single-phase load, comprising a single-phase output circuit connected to two of said terminals, a capacitor and a saturable reactor connected in parallel across said two terminals, a capacitor connected between the star-point of the alternator and the one of said two terminals that has lagging phase voltage relative to the other, and a capacitor connected between said star-point and the third one of said terminals.

2. With a capacitively excited asynchronous alternator having star-connected three-phase windings and three respective terminals connected to said windings, the combination of an excitation device for operating a single-phase load, comprising a single-phase output circuit connected to two of said terminals, a resonance circuit and a saturable reactor connected parallel to each other across said two terminals, said resonance circuit having a capacitor and an inductor connected in series with each other and being tuned to an upper harmonic frequency of the alternator, a capacitor connected between the star-point of the alternator and the one of said two terminals that has lagging phase voltage relative to the other, and a capacitor connected between said star-point and the third one of said terminals.

3. In combination, an alternator having star-connected three-phase armature windings and respective output terminals connected to said windings, a single-phase load connected across two of said three terminals, a capacitor and a saturable reactor connected in parallel to said load, a capacitor connected between the star point of the alternator and the one of said two terminals that has lagging phase voltage relative to the other, and a capacitor connected between said star point and the third one of said terminals.

4. In combination, an alternator having star-connected three-phase armature windings and respective output terminals connected to said windings, a single-phase load connected across two of said three terminals, a resonance circuit and a saturable reactor connected in parallel to said load, said resonance circuit having a capacitor and an indicator connected in series with each other and being tuned to an upper harmonic frequency of the alternator, a capacitor connected between the star point of the alternator and the one of said two terminals that has lagging phase voltage relative to the other, and a capacitor connected between said star point and the third one of said terminals.

No references cited